UNITED STATES PATENT OFFICE.

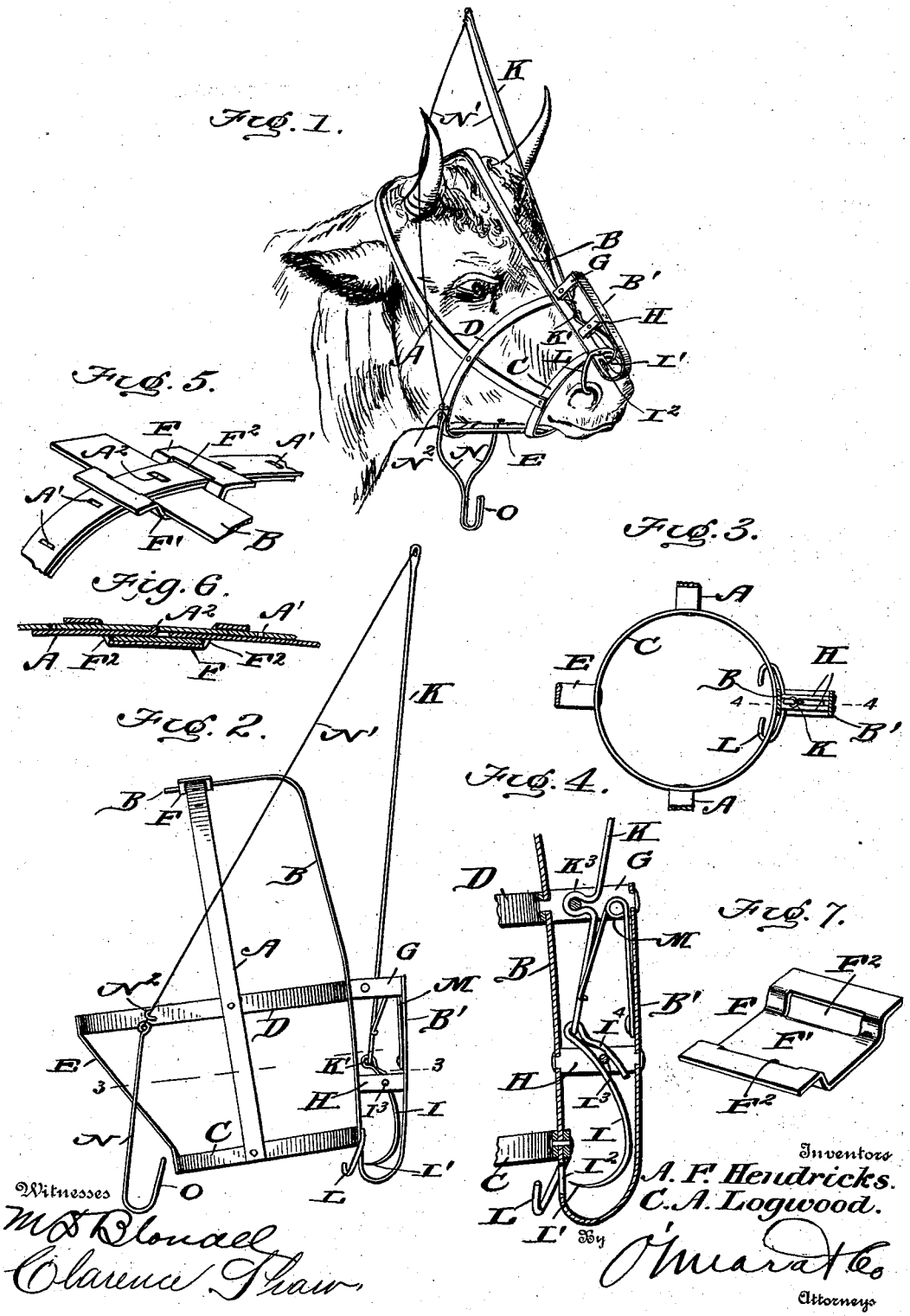

ALEXANDER FRANKLIN HENDRICKS AND CHARLES ALEXANDER LOGWOOD, OF WARREN, OKLAHOMA TERRITORY.

CATTLE-MUZZLE.

SPECIFICATION forming part of Letters Patent No. 692,659, dated February 4, 1902.

Application filed May 18, 1901. Serial No. 60,875. (No model.)

*To all whom it may concern:*

Be it known that we, ALEXANDER FRANKLIN HENDRICKS and CHARLES ALEXANDER LOGWOOD, citizens of the United States, residing at Warren, in the county of Greer and Territory of Oklahoma, have invented a new and useful Improvement in Cattle-Muzzles, of which the following is a specification.

This invention relates generally to cattle-muzzles, and more particularly to a combined muzzle and poke adapted for attachment to the head of the animal, the object of the invention being to prevent the animal passing under or over a fence or injuring the fence in any manner by the action of the head of the animal.

With this object in view the invention consists, essentially, in providing a headstall with a barb or pricking-lever, together with means for operating the said lever so as to prick the nose of the animal whenever it attempts to pass under or over a fence.

The invention consists also in providing a guard for the purpose of protecting the barb or pricking-lever and preventing it being forced into the nose of the animal except by the proper operating mechanism.

The invention consists also in certain details of construction and novelties of combination, all of which will be fully described hereinafter and pointed out in the claims.

In the drawings forming part of this specification, Figure 1 is a perspective view showing the practical application of our invention. Fig. 2 is a side elevation of the combined muzzle and poke detached from the head of the animal. Fig. 3 is a sectional view on the line 3 3 of Fig. 2. Fig. 4 is a sectional view taken on the plane of the line 4 4 of Fig. 3. Fig. 5 is a detail perspective view showing the manner of connecting the side and front straps of the muzzle. Fig. 6 is a sectional view showing the same connection. Fig. 7 is a detail perspective view of the buckle for uniting the said parts.

In carrying out our invention we employ a headstall, which is preferably comprised of the side straps A, the front straps B, the nose-strap C, and the cheek-strap D, said nose and cheek straps being arranged transverse to the side and front straps and attached thereto by rivets, and the front strap E is also connected to the nose and cheek straps upon the under side in order to hold the said straps in their proper relative positions.

The upper ends of the side straps A and the front strap B are adjustably connected by means of a tongueless buckle F, said buckle consisting of a metallic plate or casting having a central depressed portion $F'$, in which the end of the front strap rests, the side members having openings $F^2$, through which the ends of the side straps pass, said side straps overlapping each other in their passage through the buckle and resting above the front strap B, and in order to securely fasten the straps in their adjusted positions we provide one of the side straps with a series of perforations $A'$ and strike up lugs or tongues $A^2$ upon the other side strap, said lugs entering the perforations and holding the straps in their adjusted positions. It will thus be seen that the head-stall can be quickly and easily adjusted to the head of any size animal. The forward end of the front strap B projects a considerable distance beyond the nose-strap C, and this forwardly-projecting portion is curved and bent back upon itself, as shown at $B'$, substantially parallel to the front strap, thereby providing a guard for the poke-barb or pricking-lever, which is arranged between the guard and the front strap. The guard and front strap are preferably connected by two sets of parallel posts G and H, respectively, and the poke-barb or pricking-lever I is pivoted between the posts H, while the operating-lever K is pivoted between the posts G, the lower end of the lever K being pivotally connected to the upper end of the barb or pricking-lever, as shown at $K'$, the lower end of said lever being sharpened, as indicated at $I'$, and is adapted to be projected through an opening $I^2$, so that it can be forced into contact with the nose of the animal. The upper end of the lever K projects a considerable distance above the head of the animal, and therefore provides an obstruction against which the strands or rails of the fence will strike in case the animal should attempt to pass under the fence, and the moment the upper end of the operating-lever K is forced rearwardly the lower end of said lever acts upon the barb or pricking-lever and forces the prong or point into the nose of the animal. A suitable nose-ring L is attached to the lower end of the headstall and is inserted into the nostrils of the animal for the purpose of holding the lower end of the guard firmly upon the nose of the animal. The barb or pricking-lever I is preferably formed of wire, and likewise the operating-lever K. The pricking-lever I is bent between its ends to form a connection with the operating-lever, the upper end being bent back, as at I$^4$, upon the body portion and straddles a rivet I$^3$, carried by the frame and which forms a pivot for the said lever. The operating-lever is formed with a crimp K$^3$ to form its pivotal bearing.

A spring M is attached to the inner face of the guard B', its free end bearing upon the lower end of the operating-lever, said spring normally holding the operating-lever and the barb or pricking-lever in such position that the point or prong will not come in contact with the nose of the animal. When, however, the operating-lever is forced rearwardly, the tension of the spring is overcome and the pricking-lever is operated, as heretofore described.

The mechanism thus far described is adapted to prevent the animal passing under or over a fence, and in order to prevent the animal passing over the fence we provide a depending wire bail N, suspended by wires or guards N', extending from the upper end of the operating-lever K, passing through eyes or loops N$^2$, arranged upon the cheek-band D, said bail N terminating in a forwardly-projecting hook O, which is adapted to catch upon the rail or wire of the fence whenever the animal attempts to jump over it, and as soon as the hook of the bail catches in the said obstruction the upper end of the operating-lever is forced rearwardly, thereby operating the barb or pricking-lever in exactly the same manner as already described.

It will thus be seen that we provide an inexpensive and thoroughly efficient cattle muzzle and poke which will effectively prevent the animal passing under or over the fence or through the same, and it will also be noted that by providing a guard for the barb or pricking-lever the prong will never be forced into the nose of the animal except at the time and in the manner indicated.

Having thus fully described our invention, what we claim as new, and desire to secure by Letters Patent, is—

1. A combined cattle muzzle and poke comprising a headstall having a barb or pricking-lever arranged thereon, an operating-lever attached also to the headstall and connected with the barb or pricking-lever, and the guard for protecting the barb or pricking-lever, substantially as shown and described.

2. A combined cattle muzzle and poke comprising a headstall having a barb or pricking-lever arranged thereon, an operating-lever carried also by the headstall and extending upwardly, and a hook arranged below the headstall and operatively connected with the operating-lever, substantially as shown and described.

3. In a device of the kind described, the combination with the headstall, of a barb or pricking-lever attached thereto, the operating-lever connected to the barb or pricking-lever, the cords or wires depending from the upper end of the operating-lever, and the bail suspended by the cords or wires and terminating in a forwardly-projecting hook, substantially as described.

4. The combination with the headstall, of a guard arranged thereon, the barb and operating-lever pivotally arranged between the headstall and guard, the depending bail and means connecting the upper end of the operating-lever and the said depending bail, substantially as herein shown and described.

ALEXANDER FRANKLIN HENDRICKS.
CHARLES ALEXANDER LOGWOOD.

Witnesses:
JOHN HORTON,
JAS. BROWN.